US010593149B2

(12) United States Patent
Nelson

(10) Patent No.: US 10,593,149 B2
(45) Date of Patent: Mar. 17, 2020

(54) SKILL BASED MOBILE DEVICE INPUT TO EFFECT GAME OUTCOME

(71) Applicant: IGT, Las Vegas, NV (US)

(72) Inventor: Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 133 days.

(21) Appl. No.: 15/841,823

(22) Filed: Dec. 14, 2017

(65) Prior Publication Data

US 2019/0188953 A1 Jun. 20, 2019

(51) Int. Cl.
*G06F 17/00* (2019.01)
*G07F 17/32* (2006.01)

(52) U.S. Cl.
CPC ...... *G07F 17/3225* (2013.01); *G07F 17/3267* (2013.01); *G07F 17/3288* (2013.01); *G07F 17/3293* (2013.01); *G07F 17/3295* (2013.01)

(58) Field of Classification Search
None
See application file for complete search history.

(56) References Cited

U.S. PATENT DOCUMENTS

| | | | | |
|---|---|---|---|---|
| 8,814,686 B2 * | 8/2014 | Takeda | A63F 13/2145 463/31 |
| 2012/0249443 A1 * | 10/2012 | Anderson | A63F 13/06 345/173 |
| 2013/0252714 A1 * | 9/2013 | Buchholz | G07F 17/3239 463/25 |
| 2013/0296048 A1 * | 11/2013 | Jeffery | A63F 13/12 463/31 |

* cited by examiner

*Primary Examiner* — Paul A D'Agostino
(74) *Attorney, Agent, or Firm* — Sheridan Ross P.C.

(57) ABSTRACT

Disclosed are various embodiments for generating an outcome for a wagering game based on a trajectory of a virtual projectile launched in a skill-based or pseudo skill-based portion of a wagering game. The trajectory of the virtual projectile can originate from a client device. The trajectory can be determined based in part on sensor measurements from the client device. Data describing the sensor measurements can be received from the client device.

20 Claims, 12 Drawing Sheets

SKILL BASED MOBILE DEVICE INPUT TO EFFECT GAME OUTCOME

BACKGROUND

A slot machine is a casino gambling machine with reels of indicia. When a wager is placed, a wagering game can be initiated on the slot machine. The wagering game can involve the reels of indicia spinning into random positions. An award for the wagering game can be determined using the random positions of indicia. The positions of the indicia can be compared to outcomes in a pay table. For some outcomes, a bonus game can be initiated. The bonus game can award an additional award to a patron.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

In a casino, patrons can wager money on a casino or personal gaming device. The gaming device can utilize probability to randomly select one of several potential outcomes. Some of the potential outcomes include activating game features or bonus games. Although the outcome of a gaming device is typically out of the hands of a patron, a game feature or bonus game can involve an element of skill or provide a patron with a perception that the game involves skill, which is referred to herein as pseudo skill.

Client devices such as smart phones and tablets are commonly carried by patrons while playing in a casino or playing online. The client device can include several sensors that may be used to facilitate a skill-based game, such as launching a virtual projectile, like a dart, at a virtual target. The patron can launch the dart toward the target by swiping on the client device toward the gaming device. The properties of the travel path, referred to herein as a trajectory, for the virtual projectile can be based on the movement and position of the client device. The patron can point the client device upward or downward to increase or decrease a pitch of the virtual projectile or rotate the client device while swiping to generate a spin on the virtual projectile.

As such, the patron can use the client device to aim the virtual projectile at a desired target. Whether the virtual projectile hits the desired target is based primarily on how much skill the patron exhibits while launching the projectile. The patron can utilize skill via the client device to influence and/or control the outcome, rather than relying on random probability for the outcome on the gaming device.

In the following discussion, a general description of the system and its components is provided, followed by a discussion of the operation of the same.

Figure 1:
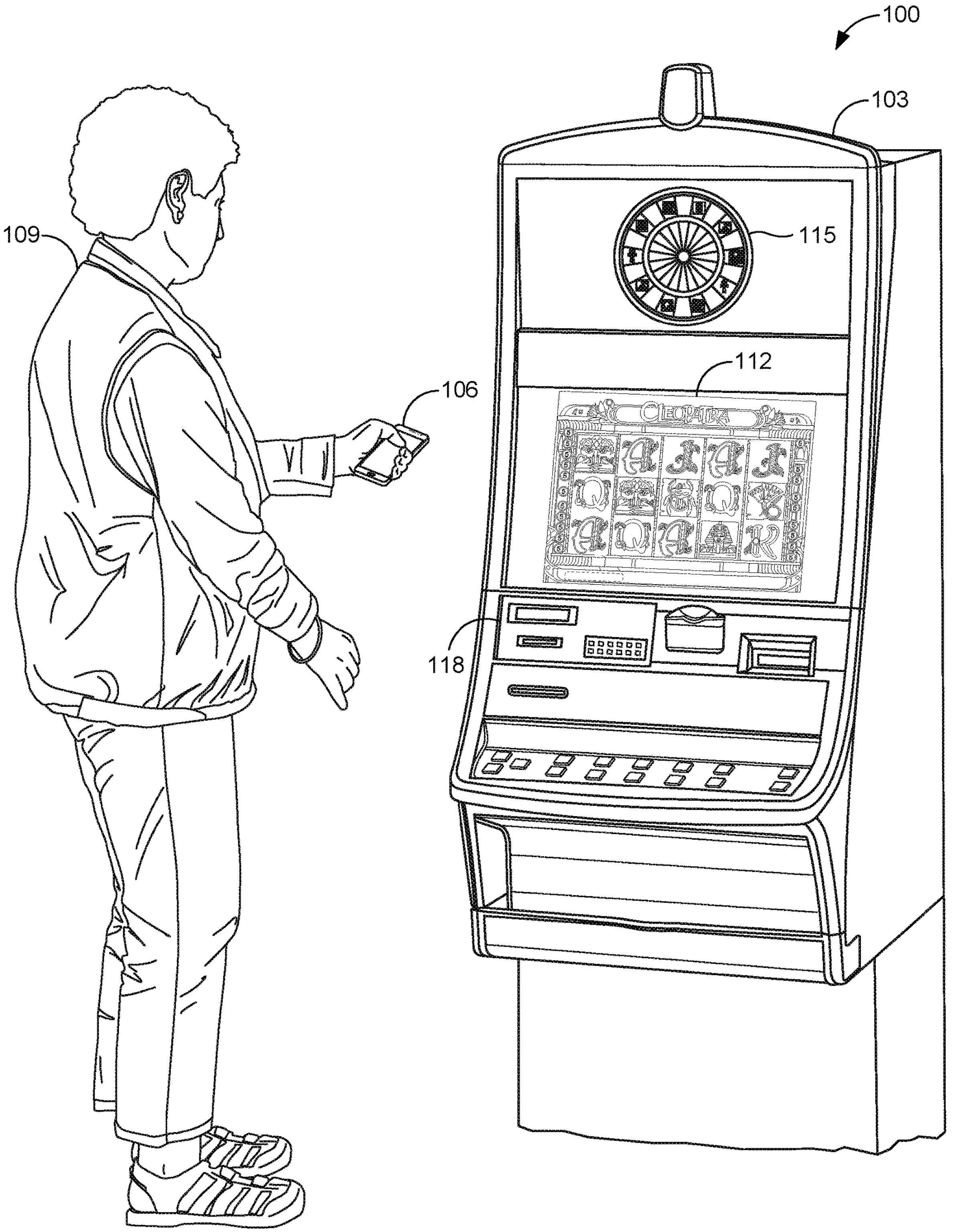
FIG. 1 is an illustration of a gaming environment according to various embodiments of the present disclosure.

With reference to FIG. 1, shown is a gaming environment 100 according to various embodiments. The gaming environment 100 includes a gaming device 103 and a client device 106. The gaming device 103 can have one or more displays to facilitate the playing of wagering game, such as, for example, displays 112 and 115. The wagering game can include a skill based or pseudo skill-based feature such that the skill of a patron 109 can impact or appear to impact the outcome of the wagering game. The gaming device 103 can include a player tracking module 118.

The patron 109 can utilize various sensors in the client device 106 to participate in the skill based or pseudo skill-based feature of the wagering game. As an example, the patron 109 can swipe across a touch screen display of the client device 106 to simulate the launching of a dart at a display of the gaming device 103. The gaming device 103 can determine a resulting location on the display for the dart to strike based on the various sensors in the client device 106, among other factors. As an example, the resulting location on the display can be determined based on a three-dimensional position of the client device 106 relative to the gaming device 103 and characteristics of a motion of a finger when swiping across the screen such as speed and direction.

In some embodiments, the player tracking module 118 can utilize a portion of the display 112 or 115. As an example, the gaming device 103 can render a window on a portion of the display 112 including patron information. The player tracking module 118 can communicate with one or more gaming systems and can enable a gaming device 103 to track game play activity of the patron 109. The gaming device 103 can also include a cash in device, such as a bill validator or a coin acceptor. These cash in devices can be used by the patron 109 to deposit a physical currency in the gaming device 103. For example, the bill validator can receive monetary notes. The bill validator can verify that the bill deposited is a real bill rather than a fake bill. The bill validator can send the monetary value and validity of each bill deposited to game application executed in the gaming device 103. The game application can increment a cash balance in a wagering game using the monetary value.

The bill validator can also scan a barcode of a ticket deposited in the bill validator. Data corresponding to the barcode can be transmitted to the game application. The game application can verify the barcode with the gaming system to determine whether there is a credit balance associated with the deposited ticket. The gaming device 103 can also include a cash out device such as a ticket printer. When the patron 109 wishes to terminate a gaming session, the patron 109 can provide an input using an input device to initiate a cash out.

The game application can cause the ticket printer to print a cash out ticket with a barcode. This barcode corresponds to data stored in one or more gaming system. The gaming system can associate the monetary value of the credit balance at the gaming device 103 with the barcode data. As will be appreciated by those skilled in the art, mechanisms other than those described herein may be used to cash in or cash out with gaming device 103 without departing from the scope of the disclosure.

Figure 2:
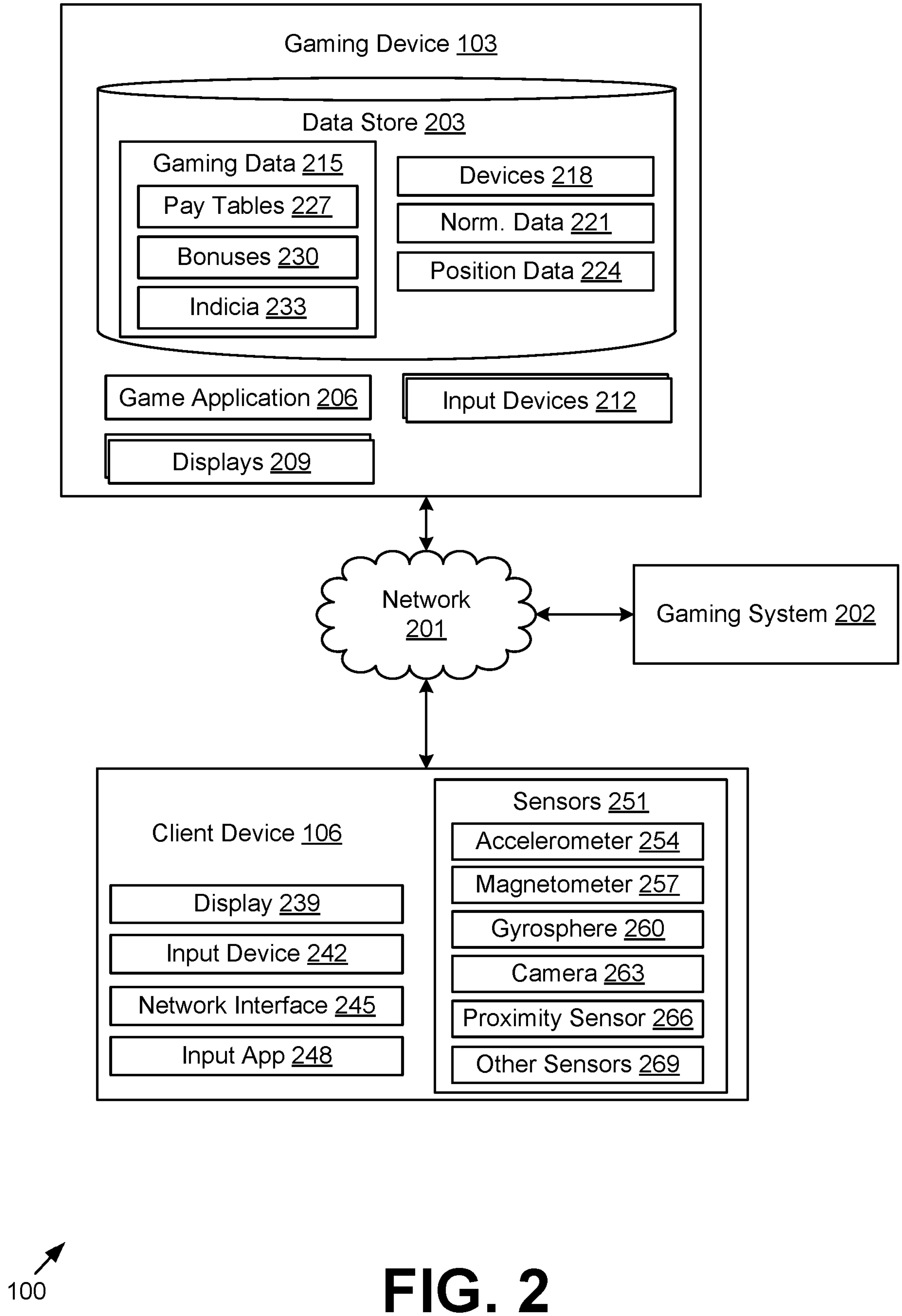
FIG. 2 is a diagram of the gaming environment according to various embodiments of the present disclosure.

With reference to FIG. 2, shown is an example embodiment of an example of the gaming environment 100 according to various embodiments. The gaming environment 100 includes a gaming system 202, a gaming device 103, and a client device 106, which are in data communication with each other via a network 201. In some embodiments, the client device 106 can be paired with the gaming device 103 via a network 201. The network 201 can include, for example, Bluetooth, Near Field Communication (NFC), the Internet, intranets, extranets, wide area networks (WANs), local area networks (LANs), wired networks, wireless networks, or other suitable networks, etc., or any combination of two or more such networks.

The gaming device 103 can include a data store 203, a game application 206, one or more displays 209, one or more input devices 212, and other components. In some embodiments, the gaming device 103 corresponds to a slot machine in a casino. In other embodiments, the gaming device 103 corresponds to a personal computer of a patron 109 in communication with a gaming server and configured to allow the personal computer to securely execute a game application 206. As an example, while on a personal computer, a patron 109 can play on an online slot machine or card game served up from a gaming server. The personal computer can include special purpose hardware to verify the location of the personal computer is within a gaming jurisdiction. The special purpose hardware can also enable and verify the secure execution of one or more gaming applications 206 with the server. The verification of the gaming application 206 by the server can enable the server to ensure that game applications 206 are not modified by the patron and to prevent cheating. When using a personal computer, the patron 109 could couple the client device 106 to their personal computer and participate in a skill-based component of the online game.

The gaming device 103 can include, for example, a slot machine. The gaming device 103 can be communicably coupled to a gaming system 202 that includes one or more backend servers facilitating functionality of a slot machine. As such, the gaming system 202 can employ a plurality of computing devices that may be arranged, for example, in one or more server banks or computer banks or other arrangements. Such computing devices may be located in a single installation or may be distributed among many different geographical locations. As an example, the gaming device 103 can include one or more computing device located on a floor of a casino in a slot machine, while one or more computing devices of a gaming system may be part of a cloud or a server bank.

Various applications and/or other functionality may be executed in the gaming device 103 according to various embodiments. Also, various data is stored in a data store 203 that is accessible to the gaming device 103. The data store 203 can be representative of a plurality of data stores 203 as can be appreciated. In some embodiments, one or more data stores 203 can be hosted separate from the gaming device 103 by the gaming system. The data stored in the data store 203, for example, is associated with the operation of the various applications and/or functional entities described below.

The components executed on the gaming device 103, for example, include the game application 206, and other applications, services, processes, systems, engines, or functionality not discussed in detail herein. The game application 206 is executed to provide a wagering game, such as for example, a slot game, a card game, a bingo game, or other wagering game. The game application 206 can render the wagering game on one or more displays 209. The game application 206 can also receive inputs from one or more input devices 212. The input devices 212 can include one or more buttons, one or more touch screen input devices, one or more motion sensors, a mouse, a keyboard, a card reader device, cameras, eye tracking devices, or another input.

The data stored in the data store 203 includes, for example, gaming data 215, a list of devices 218, normalization data 221, position data 224, and potentially other data. The gaming data 215 can include pay tables 227, bonuses 230, indicia 233, and potentially other gaming data. The pay tables 227 can include a list of payouts for the gaming device 103. The pay tables 227 can include payouts for different combinations of symbols. The bonuses 230 can include various bonus games available for the game application 206, such as, for example, those that involve input from the client device 106. The indicia 233 can include various symbols for the game application 206.

The list of devices 218 can include communication information for each client device 106 paired with the gaming device 103. In some embodiments, a history of all client devices 106, including details of the client devices 106, can be stored. The details can include an identifier associated with a pairing of the client device 106 with the gaming device 103, patron information associated with the client device 106, model information for the client device 106, an operating system version and other software version for the client device 106, and other details. In other embodiments, the list of devices 218 can be limited to only currently connected client devices 106 or client devices 106 associated with a current patron 109 (FIG. 1).

The normalization data 221 can include metadata and calibration information for client devices 106. The normalization data 221 can include general calibration information that applies to all client devices 106 and specific calibration information that applies to specific client devices 106. As an example, the general calibration information can specify pairing procedures, security protocols, information about the gaming device 103, such as location within a casino, position and height of each display 209, and available space on a floor on which a patron can maneuver, among other calibration information. The specific calibration information may apply to a single client device 106 or a group of client devices 106, such as, for example, all client devices 106 corresponding to a particular phone model or operating system.

The normalization data 221 can specify adjustments to sensor readings from the client device 106. In one embodiment, a calibration procedure for the client device 106 can be performed to determine ranges of measurements for various sensors on the client device 106. Similarly, the calibration procedure can be performed for different models of client device 106. The model information, ranges of measurements, and other client device information can be stored as metadata in normalization data 221 or in devices 218. The game application 206 can initiate calibrating a client device 106 in response to establishing communications with the client device 106.

The game application 206 can normalize sensor and input data received from a client device 103. As an example, if the normalization data 221 specifies that a particular model of client device 106 has a six inch touch screen, while another model of client device 106 has a three inch touch screen, the game application 206 can scale the length of an input received from the client device 106 to a common scale, such as, for example, between 0 and 1. To illustrate further, a three inch swipe on a six inch touch screen may be normalized to 0.5, while a three inch swipe on a three inch touch screen may be normalized to 1. Similarly, the game application 206 can normalize data from a sensor 251 to have value within a predefined range.

In some embodiments, if a sensor 251 or input device 242 on a model of a client device 106 is known to be inaccurate or have known flaws, the game application 206 can normalize data for that sensor 251 or input device 242. As one example, a camera 263 for one model of client device 106 may be known to have a specific imperfection, the game application 206 can perform lens corrective editing on an image before processing the image further.

The client device 106 is representative of a plurality of client devices that may be coupled to gaming device 103 via the network 201. The client device 106 can include, for example, a processor-based system such as a cell phone. Such a processor-based system may be embodied in the form of a smart phone, a tablet, a laptop computer, personal digital assistants, cellular telephones, music players, web pads, game consoles, electronic book readers, or other devices with like capability. The client device 106 can include a display 239, one or more input devices 242, a network interface 245, an input app 248, one or more sensors 251, and various other components. The display 239 can include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 can be configured to execute various applications such as an input app 248 and/or other applications. The input app 248 can be executed in a client device 106, for example, to participate in a skill-based or pseudo skill-based portion of a game on the game application 206 on the gaming device 103. The input app 248 can monitor the sensors 251, and send the data from sensors 251 to the game application 206. Although the several features may be discussed herein as being performed by the game application 206, it should be appreciated that those features can also be performed in part or in whole by the input app 248. As an example, the input app 248 can calculate a trajectory of a virtual projectile and send the trajectory to the game application 206 rather than or in addition to sending measurements from the sensors 251 and input devices 242.

The sensors 251 of the client device 106 can include an accelerometer 254, a magnetometer 257, a gyroscope 260, a camera 263, a proximity sensor 266, or other sensors 269. The sensors 251 can measure movement of the client device 106 during a skill or pseudo skill-portion of a wagering game to be used as input along with input received from the input device 242. As an example, the sensors 251 can monitor the movement of the client device 106 while a patron swipes along a touch screen input device 242 to launch a virtual projectile from the client device 106 to the gaming device 103, where properties of the virtual projectile are based on the measurements from the sensors 251 and the direction and velocity of the swipe. The input app 248 can send data describing movement across a touch screen of the display 239 over a predefined period of time.

Next, a general description of the operation of the game application 206 is provided. To begin, the game application 206 can generate a user interface corresponding to a game on the display 209. The user interface can include one or more indicia, such as indicia 233. As an example, the indicia 233 can be organized into columns and rows, and the game application 206 can provide outcomes of a wagering game in response to a patron placing a bet. The outcomes can include a base game outcome and a bonus game outcome. In some embodiments, a bonus game can be initiated based on the base game outcome. In one example, if three of a predefined indicia 233 are visible in a base game outcome of the wagering game, a bonus game may be initiated. The game application 206 can initiate communications with the input app 248 during the bonus game.

The bonus game can provide a bonus game outcome for the wagering game. In one embodiment, the bonus game involves launching a virtual projectile at a dart board, and the game application 206 updates the user interface to include a dart board. The dart board can include indicia 233 or other symbols corresponding to the wagering game.

The base game and the bonus game can include one or more skill-based or pseudo skill-based components. A patron 109 can attempt to control a virtual projectile by positioning the client device 106 and swiping toward the display 209. The patron 109 can attempt to hit one or more targets on the display 209 to change the resulting outcome. The resulting outcome can be increased, decreased, or remain unchanged based on the input from the patron 109. The input app 248 can send data describing measurements from the sensors 251 and the input device 242 to the game application 206.

The game application 206 can determine a position on the display 209 using the data describing the measurements from the sensors 251 and the input device 242. The bonus game can include one or more targets on the display 209. The game application 206 can determine the position on the display 209 by calculating a trajectory of the virtual projectile. The position can correspond to where the trajectory of the virtual projectile intersects the display 209.

The game application 206 can calculate the trajectory of the virtual projectile using the data describing the measurements from the sensors 251 and the input device 242. A speed of the virtual projectile can be based upon a velocity and/or acceleration of a swipe on the input device 242. The input app 248 can instruct the user to swipe from a first end of the display 239 to a second end of the display 239. The game application 206 can determine an angular deviation of the actual swipe to the instructed swipe.

The game application 206 can also determine a deviation of an alignment of the client device 106 with respect to the display 209. As an example, the game application 206 can instruct the user to position the client device 106 perpendicular to the display 209. The deviation of the alignment can correspond to a deviation from perpendicular. The deviation of the alignment can be based on a three-dimensional position of the client device 106. The game application 206 can determine a three-dimensional position or orientation of the client device 106 relative to the display 209. The position can be determined based on measurements from one or more of the accelerometer 254, the magnetometer 257, the gyroscope 260, the camera 263 and the other sensors 269.

The angular deviation for the swipe and the deviation for the alignment can be summed to determine an initial three-dimensional direction vector for the virtual projectile. The game application 206 can calculate a trajectory of the virtual projectile using the speed of the virtual projectile and the three-dimensional direction vector for the virtual projector. The trajectory of the virtual projectile can also include a curvature. The game application 206 can calculate a rotation of the client device 106 during the swipe on the client device 106. The rotation can be calculated based on measurements from the accelerometer 254 and magnetometer 257.

The game application 206 can generate an outcome to the wagering game based the position determined on the display for the virtual projectile. The virtual projectile can affect the base game outcome, the bonus game outcome, or both depending on the game application 206. In one embodiment, the payout of the skill-based or pseudo skill-based portion of the wagering game is based on the pay table 227.

In some embodiments, the skill-based or pseudo skill-based portion corresponds to the bonus game. The game application 206 can generate the base game outcome of the wagering game in response to receiving an input from an input device 212. When the base game outcome designates allowing input from the client device 106, the game application 206 can cause the input app 248 to initiate a skill input mode. The skill input mode can refer to a portion of the wagering game in which a skilled input is desired. For example, a bonus game can require a skilled input. The game application 206 can instruct the input app 242 to enter a skilled input mode when a skilled input is needed in the wagering game. When in the skilled input mode, the input app 242 can render a user interface requesting the patron 109 to enter a swipe. The input app 248 can collect and send the data describing measurements from the sensors 251 and input device 242 while in the skill input mode. The game application 206 can generate the bonus game outcome using the position determined on the display 209. The base game outcome and the bonus game outcome can be rendered on the display 209.

The input app 248 and game application 206 can determine capabilities of the client device 106. In some client devices 106, one or more of the sensors 251 may be omitted or unavailable. For example, some smart phones may have a deficiency of not including a gyroscope 260 or other sensor 251. Depending on what sensors 251 are missing or unavailable on the client device 106, the calculation for the trajectory can vary or be unavailable.

As an example, if an accelerometer is unavailable, a rotation of the client device during the skill-based input can be omitted. However, if a gyroscope 260 is unavailable, the game application 206 can identify a pattern in a flooring using a camera 263 to determine a two or three dimensional orientation of the client device 106. The game application 206 can determine that the client device 106 deviates from being parallel to the floor based on the camera image. For example, the deviation with respect to the floor may be detectable based on analyzing an image from the camera to determine a size of objects in the pattern of the flooring.

In some embodiments, the orientation or rotation of the client device 106 can be calculated using more than one method using different sensors 251. The game application 206 can compare the different orientation or rotation calculations to identify a discrepancy. The game application 206 can initiate a remedial action in response to identifying the discrepancy. The remedial action can include alerting an attendant, initiating a recalibration of the client device 106, providing an offer to store a bonus game, allowing the patron to launch the virtual projectile using the input device 212, or other remedial action.

The game application 206 can select a type of bonus game for the wagering game corresponding to a particular pay table 227 based on the capabilities or deficiencies in capability of the client device 106. The game application 206 can select one of the pay tables 227 based on what calculations for trajectory are available. One pay table 227 may correspond to a skill-based game where three-dimensional position and rotation of the client device 106 can be determined, while another pay table 227 may correspond to a skill-based game where the rotation of the client device 106 is unavailable. Yet another pay table 227 may correspond to a pseudo skill-based game where neither rotation of the client device 106 nor a three-dimensional position of the client device 106 are available. The game application 206 can select between skill-based bonus games and pseudo skill-based bonus games based on the capabilities of the client device 106.

In the skill-based or pseudo skill-based portion of the wagering game, the game application 206 can render symbols in varying sizes based on a variety of criteria. In one embodiment, the size of the indicia 233 varies based on a pay table 227 or a denomination corresponding to the wagering game. For example, the indicia 233 may be bigger for a larger denomination to reward a patron for betting more, or the indicia 233 may be smaller for the larger demonization to reduce the total payout for the bonus game.

The game application 206 can increase or decrease the size of the indicia 233 in response to an event. In some embodiments, after each successful hit of an indicia, the game application 206 can reduce the size of the remaining indicia 233. The virtual projectile can be considered to hit the indicia 233 when the trajectory of the virtual projectile intersects the indicia 233 on the display 209. The game application 206 can remove the successfully hit indicia 233, and reduce the size of the remaining indicia 233 to make the difficulty of the bonus game increase after each successful hit. In one embodiment, a level of a progressive jackpot is incremented after each successful hit. Thus, a higher level progressive jackpot can require greater skill to achieve than a lower level progressive jackpot. The bonus game outcome can be based on a count of consecutive successive hits.

Figure 3:
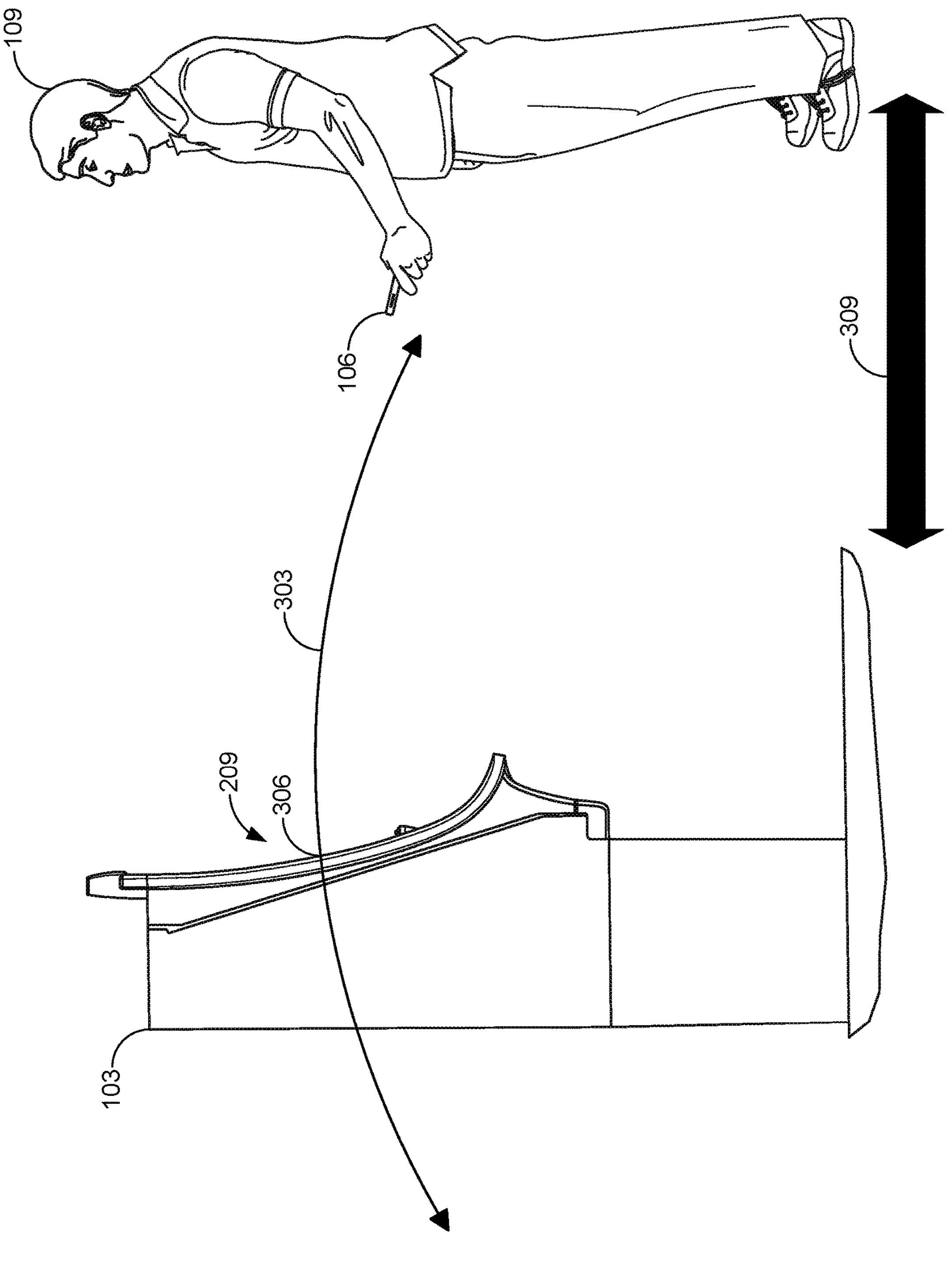
FIG. 3 is side view illustration of the gaming environment according to various embodiments of the present disclosure.

Referring next to FIG. 3, shown is another example of a gaming environment 100 according to various example embodiments. The gaming environment 100 includes a gaming device 103 positioned in front of a patron 109. The patron 109 is holding a client device 106 pointed toward the gaming device 103. During a skill-based or pseudo skill-based portion of a wagering game, the patron can provide an input, such as a swipe, to the client device to launch a virtual projectile.

The game application 206 (FIG. 2) can calculate a trajectory 303 for the virtual projectile. The trajectory 303 can originate from the client device 106 and can intersect with the gaming device 103. Depending on skill of the patron 109, the trajectory 303 may miss the gaming device 103, which can result in no bonus being awarded for the launch of the virtual projectile. The game application 206 can calculate a position 306 on the display 209 that the trajectory 303 intersects the display 209. The trajectory 303 can be based on a position of the patron 109. The patron 109 can alter the point of the trajectory 303 that intersects with the gaming device 103 by moving toward and away from the gaming device 103 on a pathway 309.

Figure 4:
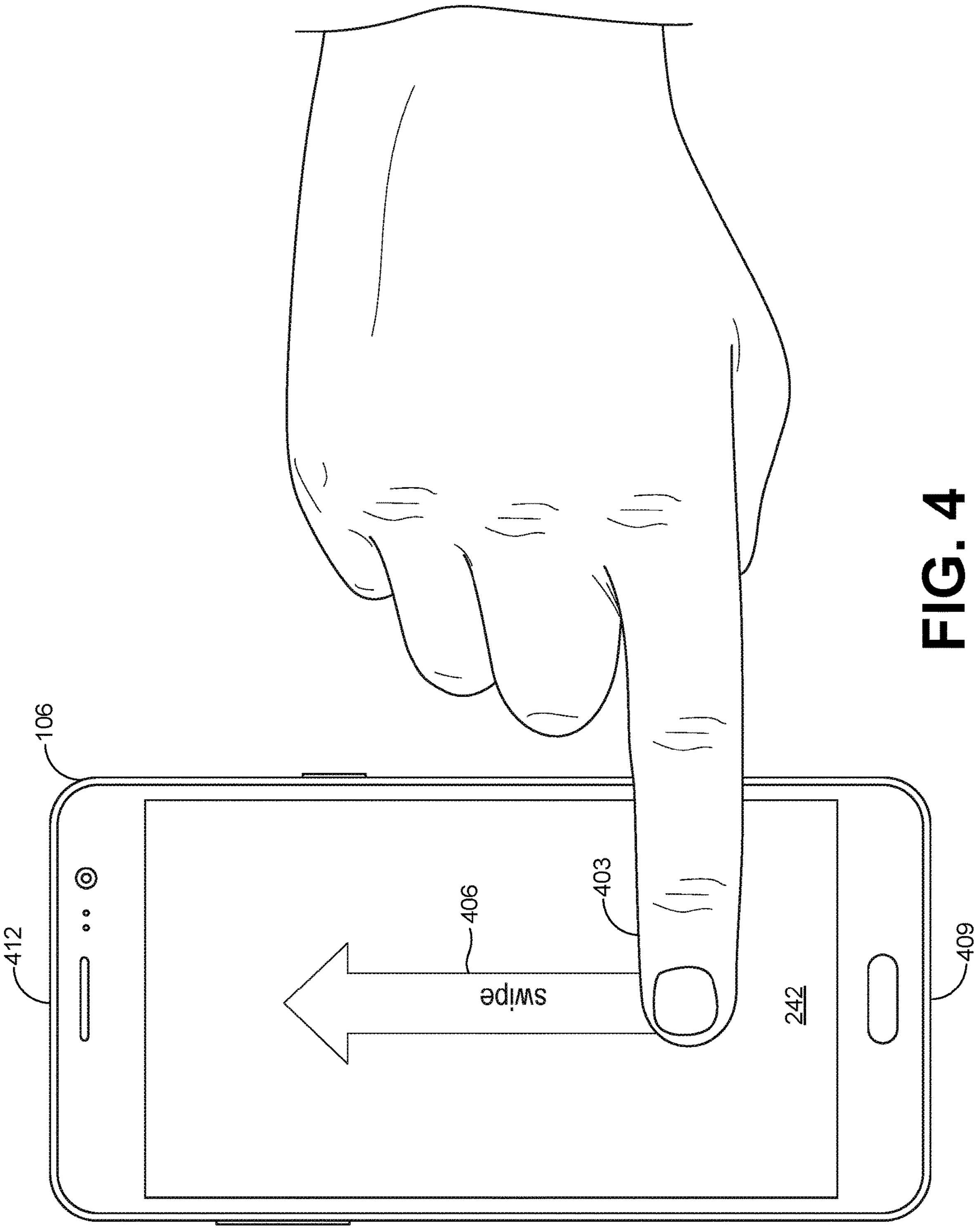
FIG. 4 is an illustration of a swipe on a client device in the gaming environment according to various embodiments of the present disclosure.

With reference to FIG. 4, shown is an example of an input by a patron 109 (FIG. 1) on a client device 106 in a gaming environment 100 according to various example embodiments. A finger 403 of a patron 109 can swipe 406 along a touch screen input device 242 of the client device 106. As shown, the patron 109 has performed a swipe 406 along a line extending from a first end 409 to a second end 412 of the client device 106. Accordingly, the swipe 406 as shown in FIG. 4 has no angular deviation from the line.

Figure 5:
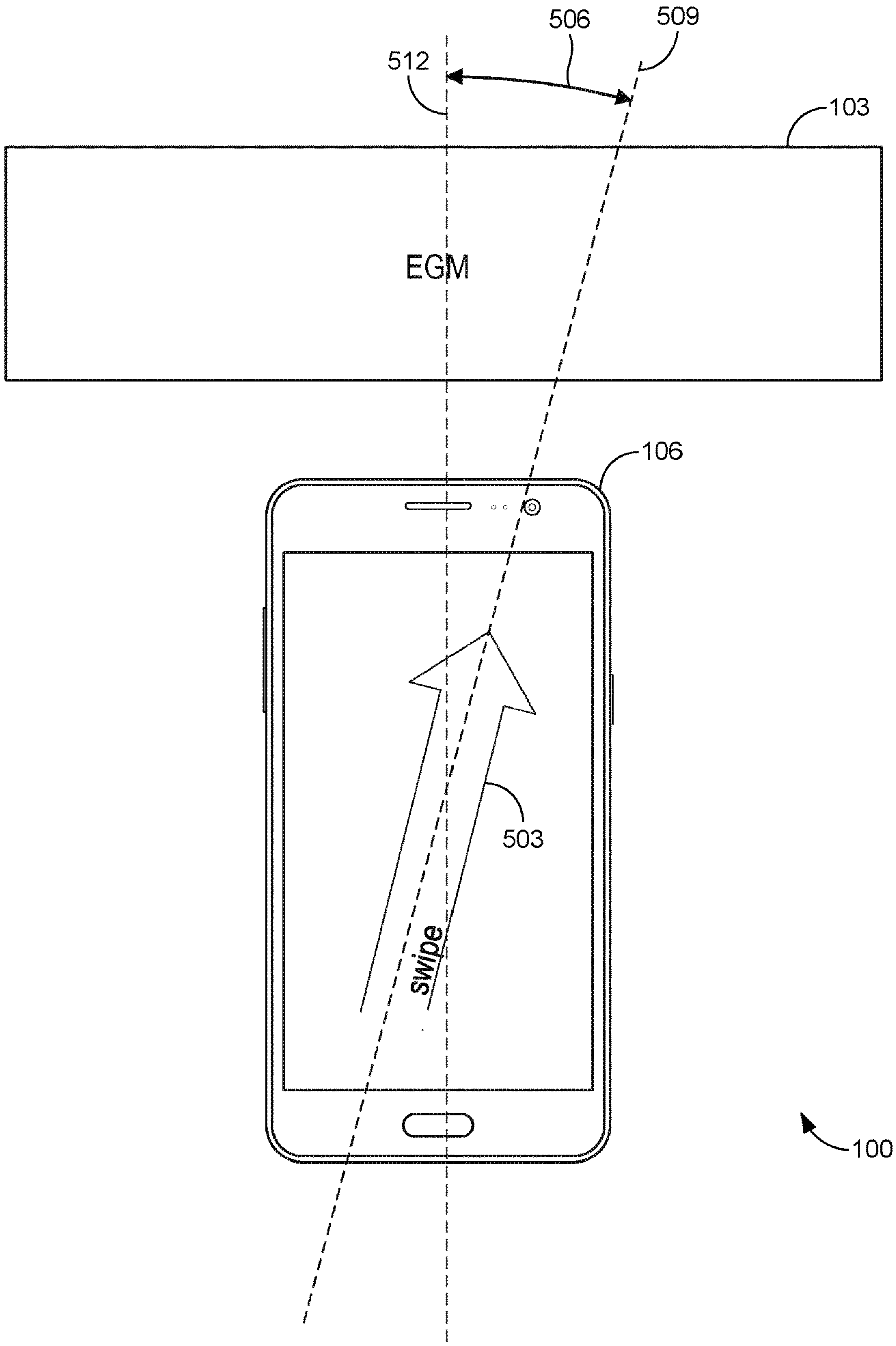
FIG. 5 is another illustration of a swipe on a client device in the gaming environment according to various embodiments of the present disclosure.

With reference to FIG. 5, shown is another example of an input on a client device 106 in a gaming environment 100 according to various example embodiments. The input app 248 (FIG. 2) can receive a swipe 503 via the input device 242 (FIG. 2). The game application 206 (FIG. 2) and input app 248 can determine an angular deviation 506 based on data from the input device 242. As an example, when a patron 109 (FIG. 1) swipes a finger across the input device 242, the input app 248 can record the data from the input device 242 over the duration of the input, and provide this touch data to the game application 206. In some embodiments, the input app 248 can calculate the angular deviation 506 as discussed herein and send the angular deviation to the game application 206.

The game application 206 can perform a linear regression on the data points from the touch input to determine a line 509. The game application 206 can calculate the angular deviation 506 between the line 509 and a line 512 corresponding to a center of a display 239 (FIG. 2) for the client device 106. The line 512 can also correspond to a center of a portion of a user interface rendered on the display 239. As an example, the user interface can include a portion designated to receive the swipe, and the line 512 can be located at a center of the portion.

Figure 6:
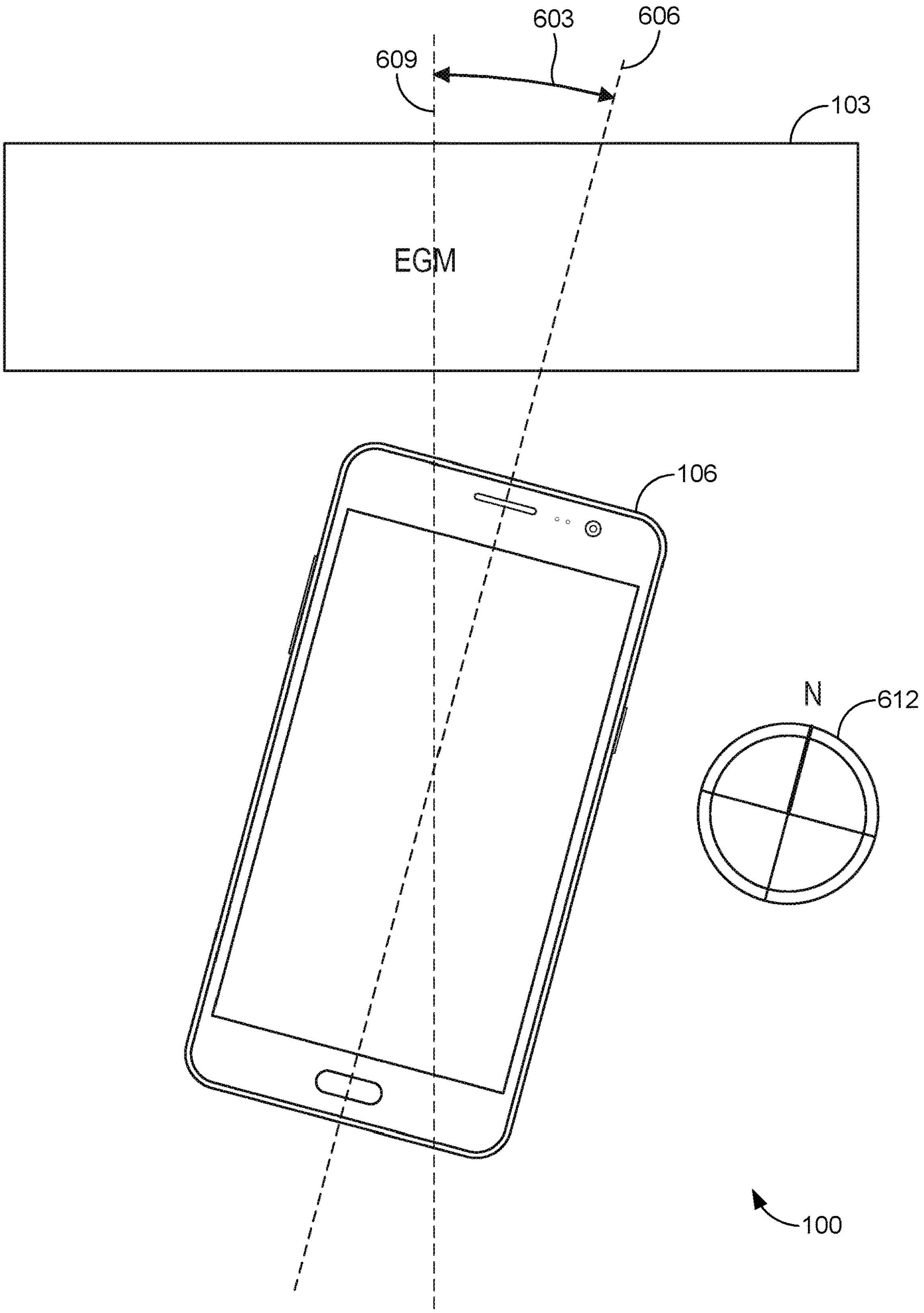
FIG. 6 is an illustration of an orientation of a client device relative to a gaming device in the gaming environment according to various embodiments of the present disclosure.

With reference to FIG. 6, shown is an example of an orientation of a client device 106 in a gaming environment 100 according to various example embodiments. The input app 248 (FIG. 2) can receive record measurements from the sensors 251 (FIG. 2) to determine an orientation of the client device 106 with respect to the gaming device 103. The game application 206 (FIG. 2) and input app 248 can determine a deviation 603 of an alignment of the client device 106 with respect to the gaming device 103. As an example, when a patron 109 (FIG. 1) swipes a finger across the input device 242 (FIG. 2), the input app 248 can record the measurements from the sensors 251 over the duration of the input, and provide this sensor data to the game application 206. In some embodiments, the input app 248 can calculate the deviation 603 in alignment as discussed herein and send the deviation to the game application 206.

The game application 206 can determine the line 609 based on the position data 224. The position data 224 can include an alignment and position of the gaming device 103. The game application 206 and input app 248 can calculate the line 609 using a current position of the client device 106 measured by the sensors 251 in comparison to the position of the gaming device 103. In some embodiments, the game application 206 can assume the client device 106 is positioned in front of the gaming device 103 and use a predetermined line 609 based on the position data 224 for the gaming device 103.

The game application 206 can determine a line 606 using the data from the sensors 251. For example, the magnetometer 257 can be used to determine a bearing on a compass 612. An azimuth, a pitch, and a roll of the client device 106 can also be determined using data from the magnetometer 257 in combination with data from the accelerometer 254. The pitch and bearing can be used to determine the deviation 603. Although the deviation 603 is shown on a horizontal plane, the deviation 603 can include a pitch of the client device 106 relative to a ground surface.

Figure 7:
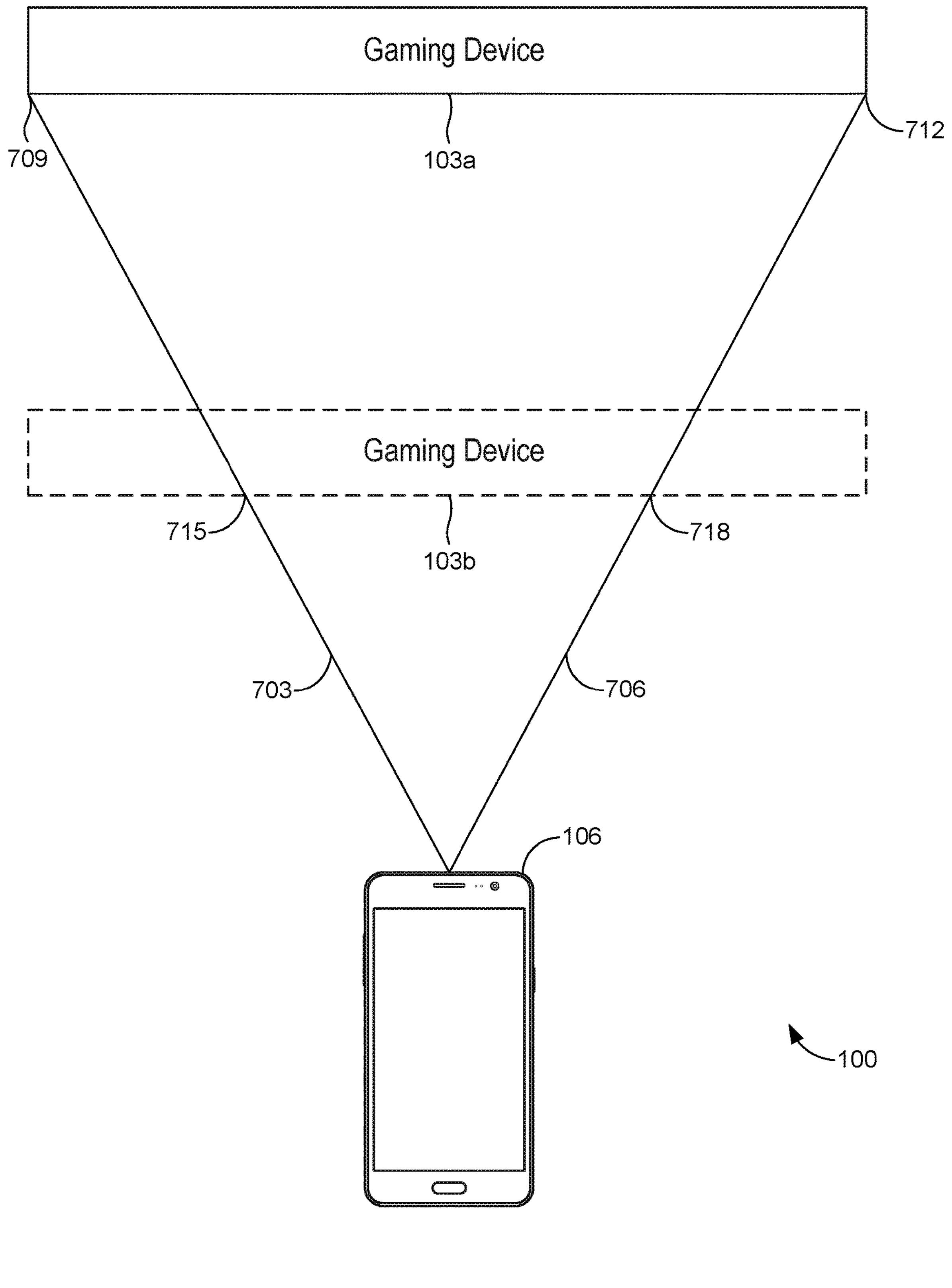
FIG. 7 is an illustration of a client device relative to a gaming device in the gaming environment according to various embodiments of the present disclosure.

Turning now to FIG. 7, shown is an example of a gaming environment 100 according to various example embodiments. As the client device 106 moves forward and backward with respect to the gaming device 103, the impact of the angular deviation 506 (FIG. 5) and the deviation 603 (FIG. 6) may change substantially. The lines 703 and 706 correspond to two different exemplary trajectories from the client device 106 to the gaming device 103*a* based on two different angular deviations 506 and deviations 603. The lines 703 and 706 can intersect the gaming device 103*a* at a first point 709 and a second point 712. The client device 106 can be at a first distance from the gaming device 103*a*.

However in some embodiments, if the client device 106 moves forward toward the gaming device 103*a*, as shown by gaming device 103*b*, the impact of the of the different angular deviations 506 and deviations 603 for the lines 703 and 706 decreases significantly. The lines 703 and 706 intersect the gaming device 103*b* at points 715 and 718. The points 715 and 718 are closer to a center of the gaming device 103*b* than the points 709 and 712 are to the center of the gaming device 103*a*. The impact of the angular deviations 506 and deviations 603 of the client device 106 can be reduced based on how close the client device 106 is to the gaming device 103.

In some embodiments, the game application 206 (FIG. 2) can specify a minimum distance that the client device 106 must be from the gaming device 103. In other embodiments, the outcome of the wagering game can be weighted based on the distance of the client device 106 from the gaming device 103. As one example, a multiplier for a bonus game can be vary based on ranges of distances between the client device 106 and the gaming device 103.

Figure 8:
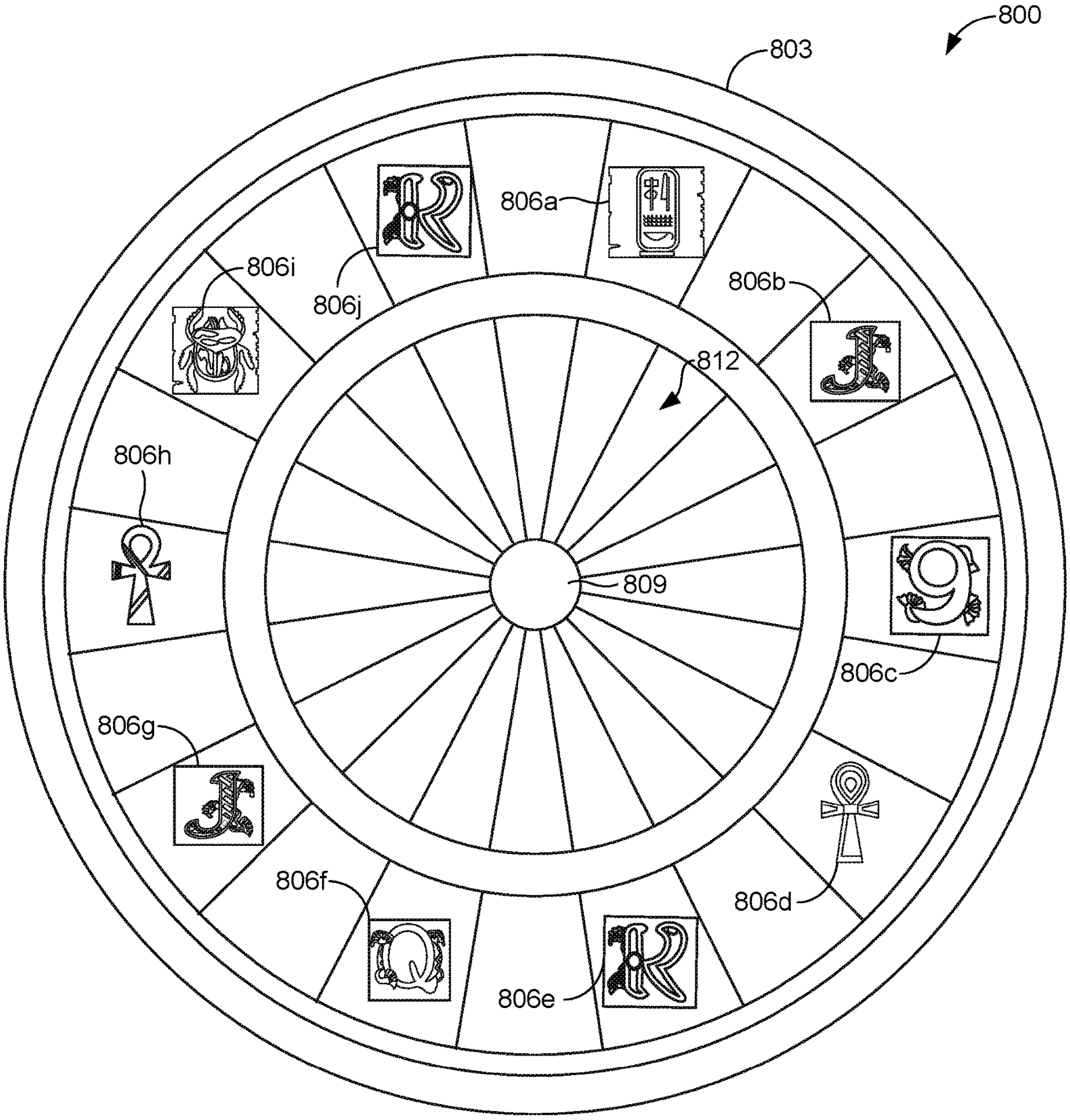
FIG. 8 is an illustration of a user interface of a gaming device in the gaming environment according to various embodiments of the present disclosure.

Moving on to FIG. 8, shown is an example user interface 800 on a display 209 (FIG. 2) of a gaming device 103 (FIG. 1) according to various example embodiments. The user interface 800 can include a dart board 803 with one or more symbols or indicia, such as, for example indicia 806*a-j*. The game application 206 (FIG. 2) can render the dart board 803 during a skill-based or pseudo skill-based portion of a wagering game. In one embodiment, the dart board 803 can be rendered during a bonus game of the wagering game.

A symbol can be selected from the indicia 806*a-f* based on where the virtual projectile intersects the dart board 803. In one example, the selected indicia can become a wild symbol in the wagering game, replace one or more other indicia on the wagering game, replace all symbols in one or more rows or columns of the wagering game, or provide some other alteration to the wagering game. The selected indicia can become wild in the base game or in one or more free spins of a bonus game. In another example, each of the indicia 806*a-f* can be assigned a value. The value can correspond to a number of credits or a multiplier. The outcome of the wagering game can be multiplied by the multiplier or the number of credits can be added to the outcome. In some embodiments, multipliers from multiple virtual projectiles can be summed to form a larger multiplier.

The bullseye 809 can correspond to a different outcome. For example, the bullseye 809 can provide the patron 109 with another bonus game, a progressive jackpot award, a maximum bonus game outcome, another round of the dart game with higher credit values or multipliers or another outcome. The inner region 812 of the dart board 803 can also provide an enhanced jackpot outcome. For example, selection of indicia 806*a* in an outer region can cause the indicia 806*a* to be wild, while selection of indicia 806*a* in an inner region 812 can cause the indicia 806*a* to replace one or more other indicia 806*a* in a wagering game.

In some embodiments, indicia on the dart board 803 can be randomly selected from available indicia in the wagering game. In other embodiments, a number of indicia can be selected from indicia currently visible in a base game. The selection of a number of indicia in this manner can ensure that some of the indicia 806*a-j* on the dart board 803 result in a better outcome for the patron 109, while others of the indicia 806*a-j* result in a lesser outcome for the patron 109. In yet other embodiments, the indicia on the dart board 903 can be predetermined from available indicia in the wagering game.

Figure 9:
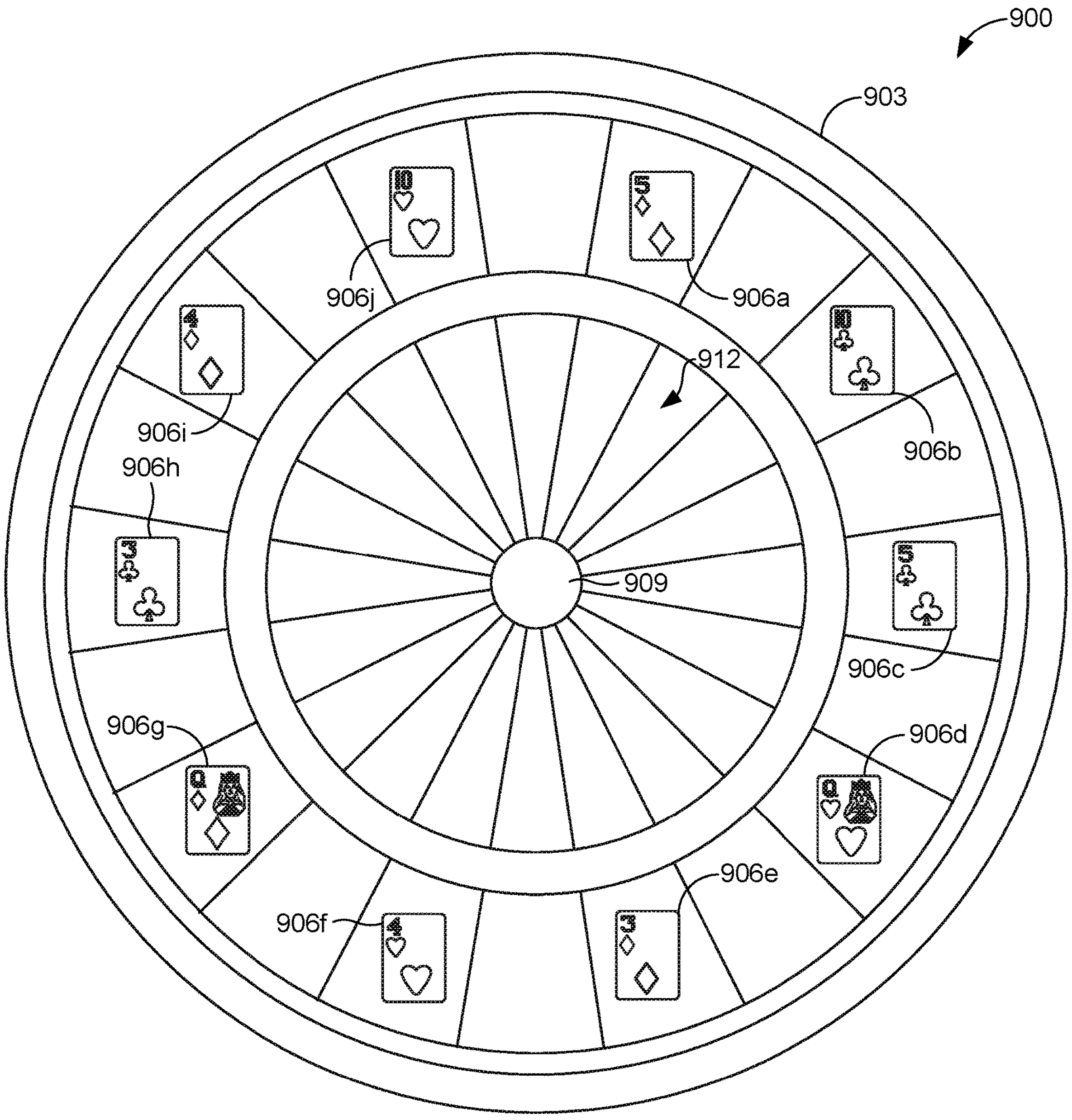
FIG. 9 is an illustration of a user interface of a gaming device in the gaming environment according to various embodiments of the present disclosure.

With reference to FIG. 9, shown is another example user interface 900 on a display 209 (FIG. 2) of a gaming device 103 (FIG. 1) according to various example embodiments. The user interface 900 can include a dart board 903 with one or more playing cards, such as, for example, playing cards 906*a-j*. The game application 206 (FIG. 2) can render the dart board 903 during a skill-based or pseudo skill-based portion of a wagering game. In one embodiment, the dart board 903 can be rendered during a bonus game of the wagering game.

A symbol can be selected from the playing cards 906*a-f* based on where the virtual projectile intersects the dart board 903. In one example, the selected playing card can become a wild card in a card game, provide a multiplier for the result of the card game, add to the award of a successful outcome of the card game, or provide some other alteration to the card game. In another example, each of the playing cards 906*a-f* can be assigned a value. The value can correspond to a number of credits or a multiplier. The outcome of the card game can be multiplied by the multiplier or the number of credits can be added to the outcome. In some embodiments, multipliers from multiple virtual projectiles can be summed to form a larger multiplier.

The bullseye 909 can correspond to a different outcome. For example, the bullseye 909 can provide the patron 109 with another bonus game, a progressive jackpot award, a maximum bonus game outcome, a royal flush award, or another outcome. The inner region 912 of the dart board 903 can also provide an enhanced jackpot outcome. For example, selection of playing card 906*a* in an outer region can cause the five of diamonds to be wild for all diamond card or any face card, while selection of playing card 906*a* in an inner region 912 can cause the five of diamonds to be wild for any card in the card game.

In some embodiments, the playing cards on the dart board 903 can be randomly selected from a deck of cards. In other embodiments, a number of playing cards can be selected from playing cards currently in a hand of the patron 109 for a card game or community playing cards already dealt in the card game. The selection of a number of playing cards in this manner can ensure that some of the playing cards 906*a-j* on the dart board 903 result in a better outcome for the patron 109, while others of the playing cards 906*a-j* result in a lesser outcome for the patron 109. In yet other embodiments, the playing cards on the dart board 903 can be predetermined from a deck of cards.

Figure 10:
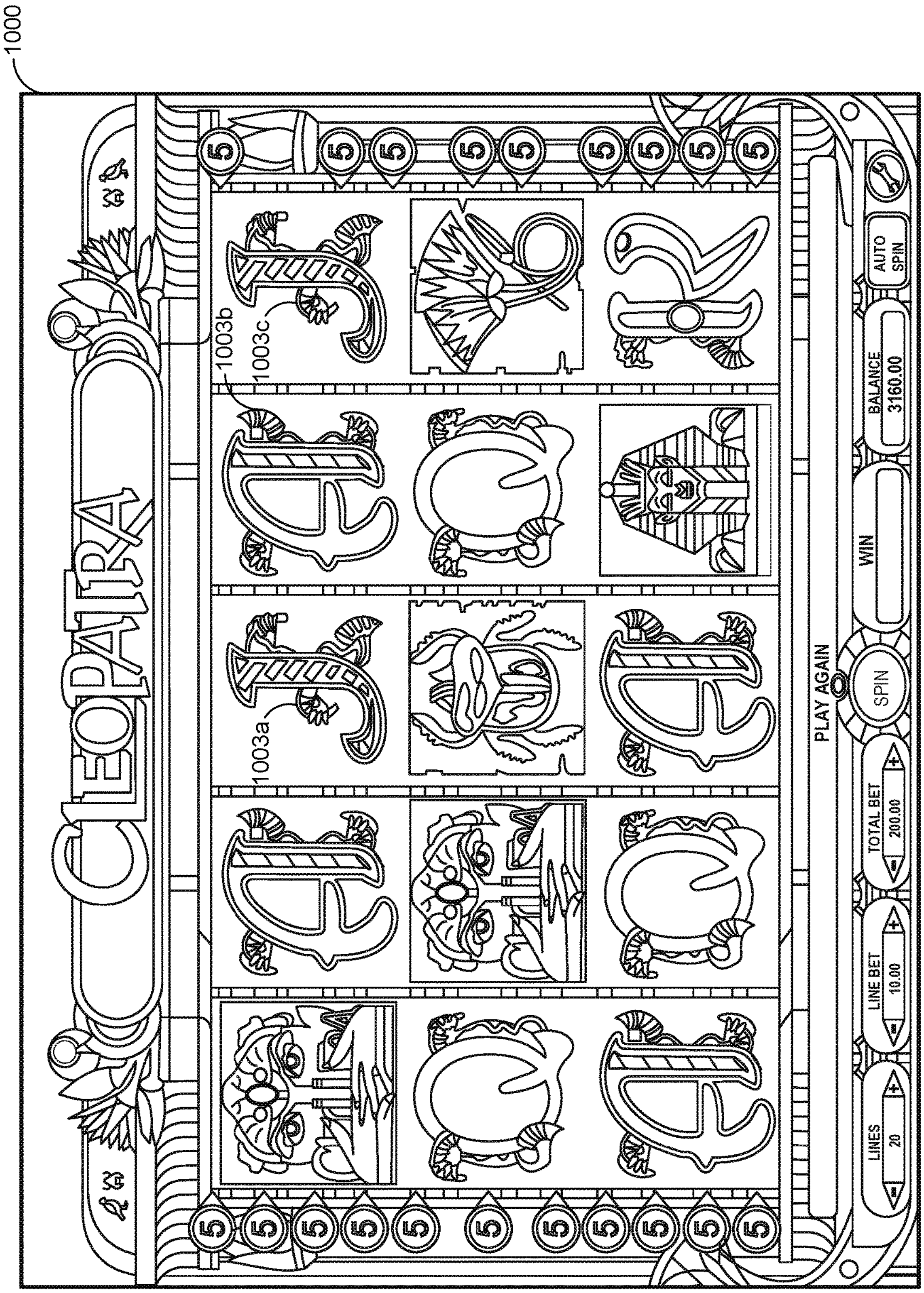
FIG. 10 is an illustration of a user interface of a gaming device in the gaming environment according to various embodiments of the present disclosure.

With reference to FIG. 10, shown is an example of a user interface 1000 of a wagering game on the gaming device 103 (FIG. 1) according to various example embodiments. The user interface 1000 can include one or more indicia, such as, for example indicia 1003*a-c*. In one embodiment, a virtual projectile can be launched at the user interface 1000 via a client device 106 (FIG. 1). One of the indicia can be selected via the virtual projectile. The selected indicia can become wild, change to another symbol, or alter the wagering game in some other manner.

Figure 11:
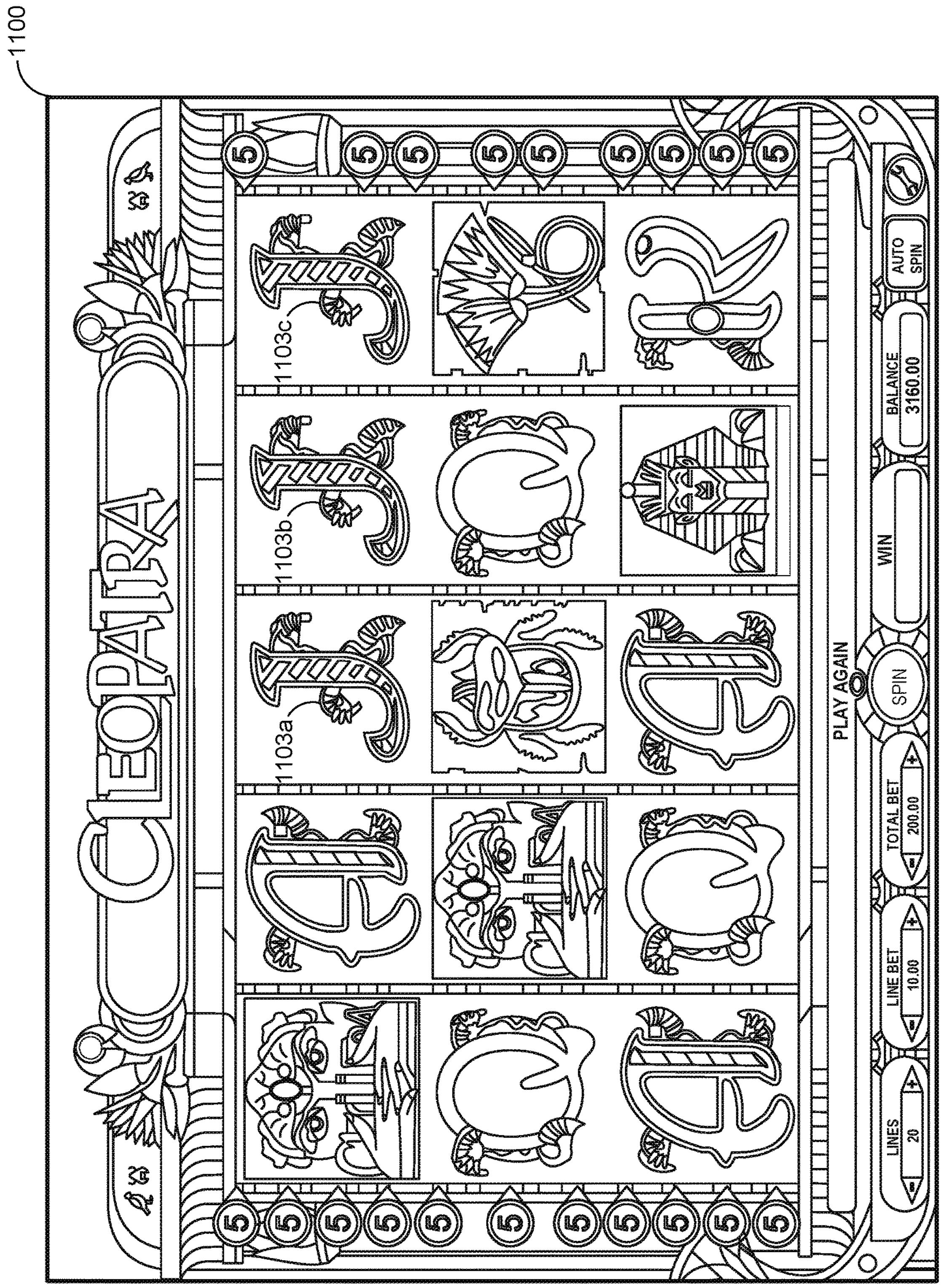
FIG. 11 is an illustration of a user interface of a gaming device in the gaming environment according to various embodiments of the present disclosure.

With reference to FIG. 11, shown is another example of a user interface 1100 of a wagering game on a gaming device 103 (FIG. 1) according to various example embodiments. The user interface 1100 can include one or more indicia, such as, for example indicia 1103*a-c*. In one example, the user interface 1100 can represent user interface 1000 (FIG. 10) after the indicia 1103*b* was selected by launching a virtual projectile. In the example, the indicia 1003*b* changed from an A symbol to a J symbol, resulting in three J indicia in a row. The changing of a symbol can also cause an outcome of a wagering game be reduced if an indicia in a winning combination is selected to be changed.

Figure 12:
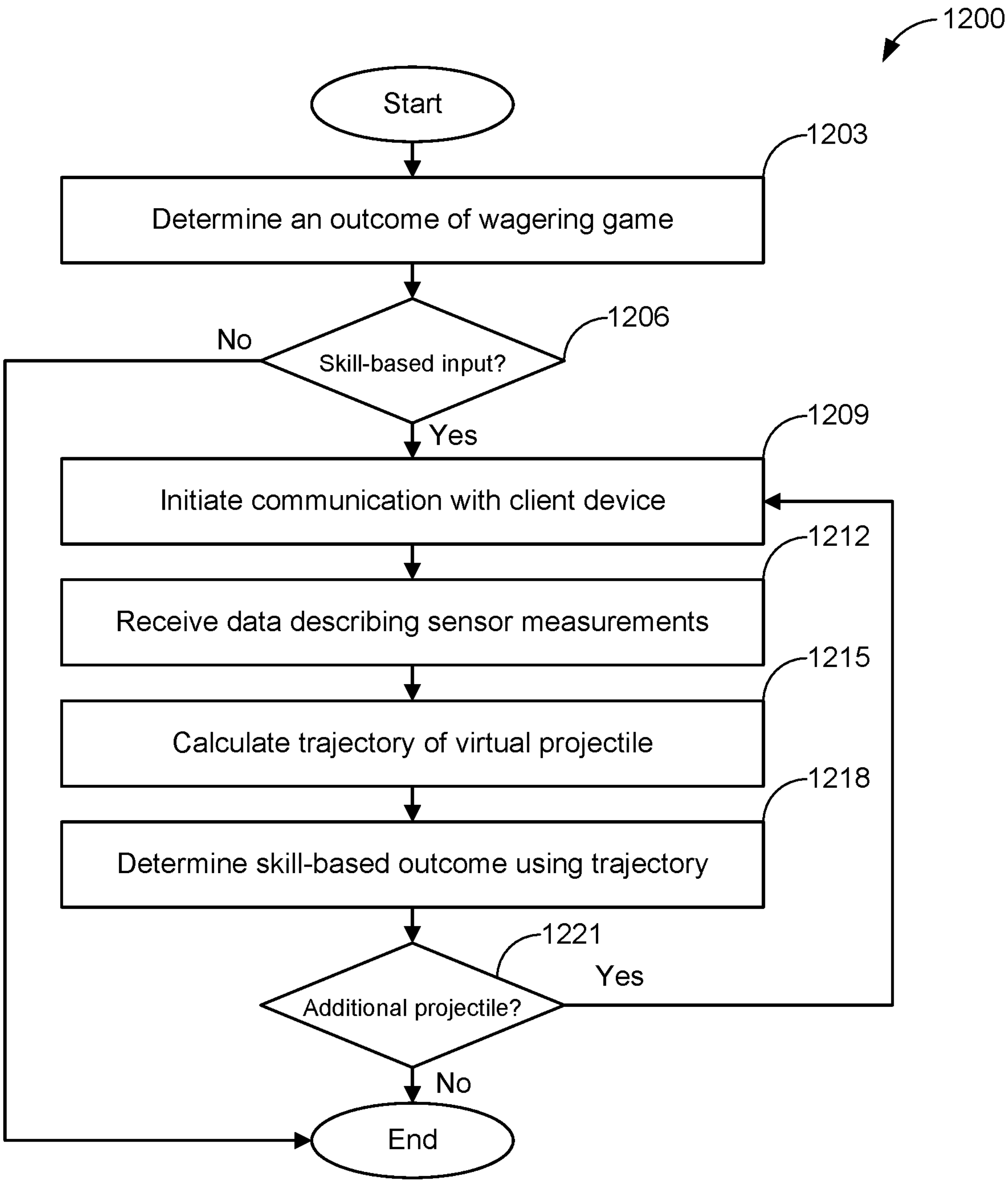
FIG. 12 is a flowchart illustrating one example of functionality implemented as portions of the game application executed in a gaming device in the gaming environment of FIG. 1 according to various embodiments of the present disclosure.

Referring next to FIG. 12, shown is a flowchart of a process 1200 that provides one example of the operation of a portion of the game application 206 (FIG. 2) according to various embodiments. It is understood that the flowchart provides merely an example of the many different types of functional arrangements that may be employed to implement the operation of the portion of the game application 206 as described herein. As an alternative, the flowchart may be viewed as depicting an example of elements of a method implemented in the gaming environment 100 (FIG. 1) according to one or more embodiments.

Beginning with box 1203, the process 1200 involves determining an outcome of a wagering game. For example, the game application 206 can initiate the reels of a slot machine or deal a hand of cards. The game application 206 can determine the outcome based on a pay table 227 (FIG. 2). As an example, if a pay line on a set of reels ends for a wagering game with a certain combination that matches an outcome in the pay table 227, the outcome can be awarded.

At box 1206, the process 1200 involves determining whether the wagering game involves a skill-based input or pseudo skill-based input. A pay table 227 can specify outcomes of the wagering game that involve a skill-based input or pseudo skill-based input. As an example, when three or more of a predetermined symbol is present on the reels, a skill-based input may be initiated. If the wagering game involves a skill-based input or pseudo skill-based input, the process 1200 proceeds to box 1209. Otherwise, the process 1200 ends.

At box 1209, the process 1200 involves initiating communication with a client device. For example, the game application 206 can initiate communication with a client device 106 (FIG. 1). In some embodiments, the client device 106 can be paired with the gaming device 103 via a Bluetooth connection. The gaming device 103 can display instructions on the display 209 to facilitate pairing of client device 106 with gaming device 103. The game application 206 can instruct the input app 248 (FIG. 2) on the client device 106 to begin a skill-based mode. In the skill-based mode, the input app 248 can render instructions to input a swipe into the input device 242. The input app 248 can capture measurements from the sensors 251 and details of the swipe during the swipe into the input device 242.

In various embodiments, the game application 206 can facilitate an initialization mode between the input app 248 and game application 206. The initialization mode can include a calibration step in which client device 106 is calibrated to gaming device 103. The calibration can be achieved by placing client device 106 at a predetermined location relative to the gaming device 103, such as, for example, in proximity to or in contact with a location on the body of gaming device 103. The data from sensors 251 can then be transmitted by the input app 248 to the game application 206. This data can be used by the game application 206 to determine a reference point for the location, orientation, and other aspects of the client device 106. The reference points can be stored in devices 218 associated with the client device 106. The initialization mode can also include one or more test inputs being made in the input app 248 to determine various capabilities of the client device 106 and/or to enable the patron 109 to become familiar with the skill-based input or pseudo skill-based input.

At box 1212, the process 1200 involves receiving data describing sensor measurements from the client device. The game application 206 can receive data describing the measurements from the input device 242 and the sensors 251 on the client device 106. In some embodiments, the input app 248 can calculate a trajectory and send the trajectory to the game application 206.

At box 1215, the process 1200 involves calculating a trajectory of a virtual projectile. The game application 206 can calculate a trajectory of the virtual projectile. The virtual projectile can originate from the client device 106. The trajectory of the virtual projectile can be calculated using the following formula:

$$y = x\tan\theta - \frac{gx^2}{2v_0^2\cos\theta}$$

where y is the vertical position, x is the horizontal position, $v_0$ is an initial velocity, g is gravity, and θ is an angle of the initial velocity. The game application 206 can calculate the initial velocity based on a speed of the swipe on the input device 242. The game application 206 can determine a range of initial velocities that result in contact a user interface on a display 209 of the gaming device 103. The game application 206 can pick a value within the range of initial velocities based on the speed of the swipe to ensure the trajectory makes it to the user interface somewhere.

The game application 206 can determine an angle on a horizontal plane using an angular deviation and an orientation deviation. As an example, if the swipe has an angular deviation of eight degrees and the device orientation deviates from alignment with the gaming device 206 by negative three degrees, the trajectory for the virtual projectile can be five degrees from center.

At box 1218, the process 1200 involves determining a skill-based or pseudo skill-based outcome based in part on the trajectory. As an example, the game application 206 can determine whether the trajectory of the virtual projectile intersects an indicia, playing card, or another target on the user interface. The game application 206 can generate an award based on whether the virtual projectile intersected a target. The award can also be based on which target the virtual projectile intersects. In some embodiments, the award is based on multiple virtual projectile launched over the course of a skill-based or pseudo skill-based portion of the wagering game.

At box 1221, the process 1200 involves determining whether the wagering game involves another skill-based input or pseudo skill-based input. As an example, the wagering game may involve launching virtual projectiles repeatedly until a failed attempt occurs. A selected target may be removed from the user interface after each successful hit of a target. In some embodiments, the targets may reduce in size after each successful hit. The targets may become more spread out across the user interface after each successful hit. In some embodiments, the lower value targets may be larger than the higher value targets. If the wagering game involves another skill-based input or pseudo skill-based input, the process 1200 proceeds to box 1209. Otherwise, the process 1200 ends.

The flowchart of FIG. 12 shows an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart shows a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowchart can be skipped or omitted.

The gaming device 103, the client devices 106, the game system 202, or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the game application 206, input app 248, and/or other components can be stored in one or more storage devices and be executable by one or more processors. The data stored in the storage devices can be encrypted to prevent tampering. The data can also be hashed such that a subsequent hash can be performed to determine if the data has been modified. Also, a data store 203 can be stored in the one or more storage devices.

The game application 206, input app 248, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

The invention claimed is:

1. A system comprising:
- at least one display; and
- at least one computing device communicatively coupled to the at least one display, the at least one computing device configured to at least:
  - generate a user interface comprising a plurality of indicia;
  - in response to a user input on a client device, receive data describing measurements from a plurality of sensors associated with the client device;
  - determine a position on the at least one display based at least in part on the data describing the measurements from the plurality of sensors; and
  - generate an outcome of a wagering game based at least in part on the position, wherein the wagering game comprises a bonus game selected from a first bonus game and a second bonus game, the first bonus game corresponding to a skill-based bonus game and the second bonus game corresponding to a pseudo skill-based bonus game, the pseudo skill-based bonus name being selected in response to identifying a deficiency in at least one capability of the at least one computing device.

2. The system of claim 1, further comprising at least one input device, wherein the at least one computing device is further configured to at least:
- in response to receiving an input from the at least one input device, generate a first outcome of the wagering game;
- in response to the first outcome being at least one designated outcome allowing input from the client device, cause the client device to initiate a skill input mode on the client device, wherein the data describing measurements from the plurality of sensors is received from the skill input mode on the client device;
- generate a second outcome based at least in part on the position, wherein the outcome of the wagering game is based on the first outcome and the second outcome; and
- render the outcome on the at least one display.

3. The system of claim 1, wherein the at least one computing device is further configured to at least:
- determine a three-dimensional position of the client device relative to the at least one display based at least in part on the data describing measurements from the plurality of sensors; and
- calculate a trajectory of a virtual projectile originating from the client device based on a speed and direction of the user input on the client device and the three-dimensional position of the client device, wherein the position on the at least one display is based at least in part on the trajectory.

4. The system of claim 3, wherein the position on the at least one display corresponds to where the trajectory of the virtual projectile intersects the at least one display.

5. The system of claim 3, wherein the user input is a swipe on a touch screen of the client device, and a direction of the trajectory is based upon a direction of the swipe and an angle of deviation of the client device from being perpendicular to the at least one display.

6. The system of claim 1, wherein user interface comprises a dart board including a plurality of symbols corresponding to the wagering game, and the position determined on the at least one display corresponds to one of the plurality of symbols.

7. The system of claim 1, wherein the plurality of indicia are playing cards and the wagering game is a card game.

8. A system comprising:
- at least one display; and
- at least one computing device communicably coupled to the at least one display, the at least one computing device configured to at least:
  - initiate communications with a client device;
  - generate a user interface comprising a plurality of indicia;
  - receive data describing an input on the client device and an orientation of the client device during the input;
  - determine a trajectory of a virtual projectile originating from the client device based at least in part on the data describing the input on the client device and the orientation of the client device during the input;
  - generate an outcome of a wagering game based at least in part on the trajectory of the virtual projectile;
  - determine at least one capability of the client device; and
  - select a type of bonus game for the wagering game corresponding to a particular pay table based at least in part on the at least one capability.

9. The system of claim 8, wherein the at least one computing device is further configured to at least calibrate a plurality of sensors on the client device responsive to initiating communications with the client device.

10. The system of claim 8, wherein the at least one computing device is further configured to normalize the data describing the input on the client device and the orientation of the client device based at least in part on metadata describing the client device.

11. The system of claim 8, wherein the at least one computing device is further configured to at least determine a rotation of the client device during the input on the client device, wherein the trajectory of the virtual projectile comprises a curvature based at least in part on the rotation.

12. The system of claim 8, wherein the data describing the input comprises a movement across a touch screen over a period of time.

13. The system of claim 8, wherein the at least one computing device is further configured to at least:

identify a discrepancy between a first measurement from a first sensor of the at least one computing device and a second measurement from a second sensor of the at least one computing device; and initiate a remedial action to resolve the discrepancy.

14. The system of claim 8, wherein the wagering game comprises a bonus game selected from a first bonus game and a second bonus game, the first bonus game corresponding to a skill-based bonus game and the second bonus game corresponding to a pseudo skill-based bonus game, the pseudo skill-based bonus game being selected in response to identifying a deficiency in at least one capability of the client device.

15. The system of claim 8, wherein the at least one computing device is further configured to:

recognize a pattern in an image captured by a camera of the client device; and identify the orientation of the client device based at least in part on the pattern.

16. The system of claim 8, wherein a size of each of the plurality of indicia is based at least in part on information maintained in a pay table.

17. A method, comprising:

initiating, via at least one computing device, communications with a client device;

receiving, via the at least one computing device, data describing measurements from a plurality of sensors associated with the client device;

calculating, via the at least one computing device, a trajectory of a virtual projectile originating from the client device based at least in part on the data describing the measurements from the plurality of sensors;

identifying, via the at least one computing device, a discrepancy between a first measurement from a first sensor of the plurality of sensors and a second measurement from a second sensor of the plurality of sensors;

initiating, via the at least one computing device, a remedial action to resolve the discrepancy; and determining, via the at least one computing device, an outcome of a wagering game based at least in part on the trajectory of the virtual projectile.

18. The method of claim 17, further comprising:

generating, via the at least one computing device, a user interface comprising a plurality of indicia;

determining, via the at least one computing device, that the trajectory of the virtual projectile intersects with one of the plurality of indicia;

in response to the trajectory intersecting the one of the plurality of indicia, iteratively determining, via the at least one computing device, whether a respective trajectory of at least one subsequent virtual projectile intersects one of the plurality of indicia; and in response to one of the at least one subsequent virtual projectile missing one of the plurality of indicia, awarding, via the at least one computing device, a bonus based at least in part on a count of virtual projectiles that consecutively intersected with one of the plurality of indicia.

19. The method of claim 17, wherein the remedial action comprises at least one of: alerting an attendant, initiating a recalibration of the client device, providing an offer to store a bonus game, and using a touch screen of the at least one computing device to launch the virtual projectile.

20. The method of claim 17, wherein the plurality of sensors comprises at least one of: an accelerometer, a magnetometer, a gyroscopic sensor, a camera, and a proximity sensor.

* * * * *